United States Patent [19]

Dykmans

[11] 4,081,219
[45] Mar. 28, 1978

[54] COUPLER

[76] Inventor: Maximiliaan J. Dykmans, 4434 Mayopan Dr., La Mesa, Calif. 92041

[21] Appl. No.: 731,514

[22] Filed: Oct. 12, 1976

[51] Int. Cl.² .............................................. F16B 7/06
[52] U.S. Cl. ..................................... 403/43; 403/301
[58] Field of Search ................................... 403/43–48, 403/301, 306, 118

[56] References Cited

U.S. PATENT DOCUMENTS

| 1,242,066 | 10/1917 | Starr | 403/47 |
| 1,452,268 | 4/1923 | Erickson | 403/301 X |
| 3,551,959 | 1/1971 | Mastalski | 403/301 X |
| 3,876,316 | 4/1975 | Sandqvist | 403/44 |

Primary Examiner—Wayne L. Shedd
Attorney, Agent, or Firm—Lyon & Lyon

[57] ABSTRACT

An adjustable coupler is on opposite ends of a cable for securing a pre-established tension in the cable. Such pre-adjusted tension is effected by conventional tensioning mechanism applied between a pair of nuts threaded on opposite ends of the cable. The coupler itself involves an elongated turnable coupling body which spans ends of the cable and in which a first nut is threaded in one of its ends and a second nut is threaded in its other end. The first nut is engageable with abutment means on one of the cable ends inside of the coupling unit. The second nut is threaded on both the cable and in the coupling body and is secured to the coupling body such that turning of the coupling body results in its movement about the axis of the cable to cause the first nut to engage the abutment means at which time the coupler is then adjusted to maintain the pre-adjusted tension. Thereafter the tensioning mechanism may be removed.

1 Claim, 1 Drawing Figure

U.S. Patent
March 28, 1978
4,081,219
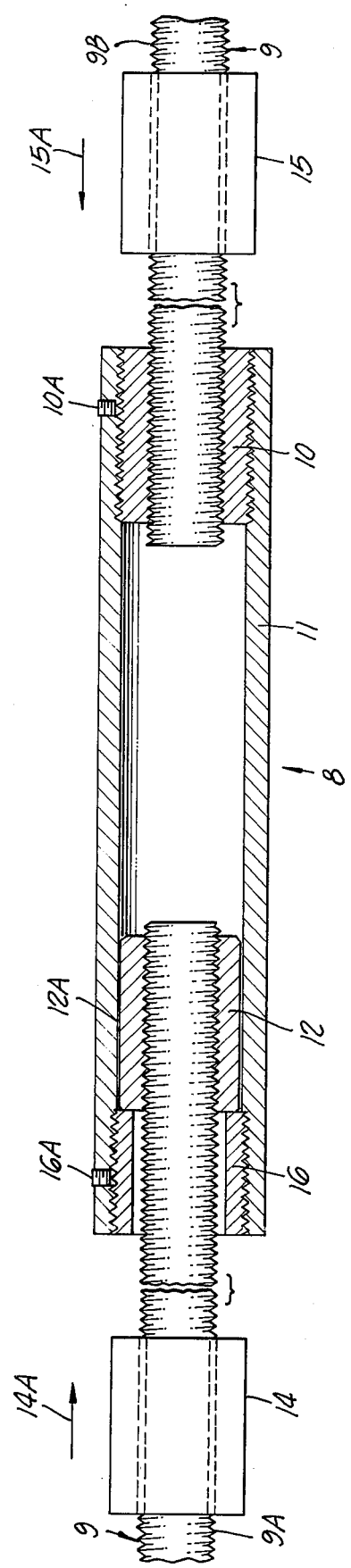

COUPLER

The present invention relates to an improved coupler which is adjustable and once adjusted is thereafter effective to maintain a pre-adjusted tension in a cable on which such coupler is mounted.

An object of the present invention is to provide an improved coupler which is particularly useful in maintaining a pre-adjusted tension in large threaded cables, sometimes referred to as Dywidag bars that are used to pre-stress concrete vessels such as, for example, large water reservoirs of prestressed concrete.

Another object of the present invention is to provide an improved coupler which is rugged and simple to operate in achieving an adjustment for securing a pre-adjusted tension in large threaded cables used in concrete prestressing operations.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

The single FIGURE of the drawing illustrates a coupler system embodying features of the present invention.

Referring to the drawing the invention is described with respect to a single threaded cable 9 or so called Dywidag thread bar which encircles a cylindrical structure such as, for example, a concrete reservoir for pre-stressing the concrete prior to filling the reservoir with water. It will be appreciated that for large diameter structures such as water reservoirs the cable 9 may be of short length thereby necessitating a plurality of such cables 9 and couplers 8, as illustrated for coupling ends 9A, 9B of such cables 9.

Nuts 14, 15 are threaded on the left and right hand ends 9A, 9B respectively of cable 9 and are considered to be fixed abutments for use as explained more fully latter to move the abutments 14, 15 closer to each other as indicated by arrows 14A, 15A by a hydraulically operated tensioning mechanism (not shown) to tension cable 9 prior to adjustment of the coupler 8.

The coupler 8 itself involves the following elements: nuts 10, 12 which are threaded on cable or Dywidag bar ends 9B, 9A respectively; a coupling body 11 to which nut 10 is secured by set screw 10A and within which nut 12 may slide at sliding connection 12A and also a cylindrical abutment or support plate 16 which is secured within coupling body 11 by set screw 16A.

A hydraulic tensioning mechanism (not shown) is used to engage the nuts 14, 15 and to move them closer together as indicated by arrows 14A, 15A to thereby achieve a certain tension in cable 9. Such tension is thereafter secured by subsequent adjustment of coupler 8 after which the tensioning mechanism may be removed.

Such adjustment of coupler 8 involves applying a torque to the coupling body 11 which results in turning of the nut 10 on cable end 9B thereby causing the cable end 9B to move further inwardly in coupling body 11 and also causing the nut 12 which is threaded on cable end 9A to slide at sliding connection 12A, inside of coupling body 11 until nut 12 engages the fixed abutment 16 after which the tensioning mechanism (not shown) may be removed.

While the set screw 10A is used to secure nut 10 to coupling body such that turning of the coupling body results in rotation about the axis of cable 9 it will be appreciated that such locking means exemplified by set screw 10A may alternatively be of such nature to lock the nut 10 to cable 9 to achieve the same result, namely inward movement of cable end 9B inwardly in coupling body 11 when and as the body 11 is turned.

It will be understood that, the invention is applicable not only to so called Dywidag bars but also to so called smooth bars which are adaptable for making connections thereto. For example, in the case of the use of so called smooth bars the elements 14, 15 used as so called jack points between which the tensioning force is applied, may be secured to the bar 9 using a wedge grip; and the ends of such smooth bar may for example be threaded and the element 12 may be secured thereto using either a taper thread or an upset thread; and the element 10 being secured to the threaded smooth bar end using either a taper or an upset thread connection between the same.

While the particular embodiments of the present invention have been shown and described, it will be obvious to those skilled in the art that changes and modifications may be made without departing from the invention in its broader aspects and, therefore, the aim in the appended claims is to cover all changes and modifications as fall within the true spirit and scope of this invention.

I claim:

1. A coupling mechanism for securing a preadjusted tension in a cable having a first cable end and a second cable end, the combination including an elongated coupling body having a first end portion and a second end portion within which said first and said second cable ends respectively extend, a first abutment means on said first of said cable ends, said first abutment means and said first end portion of said coupling body being spaced such that said first abutment means may freely move axially within said coupling body, means defining a screw threaded connection between said second cable end and said second coupling portion such that turning of said coupling body about its axis results in axial movement of said coupling body on said second cable end, a second abutment means on said first coupling end portion for engagement with said first abutment means on said first cable end, said first abutment means being spaced between said screw threaded connection and said second abutment means, said first and said second abutment means being moved into engagement by turning said coupling body about its axis to turn said coupling body on said second cable end and to move said second abutment on said first coupling portion towards said first abutment means during which said first abutment means is free to move in said coupling body, said first abutment including an element threaded on said first cable end, and said second abutment means including an element threaded within said first coupling end portion, and means for securing said second abutment means on said coupling body to prevent relative movement therebetween.

* * * * *